United States Patent
Salter et al.

(10) Patent No.: US 9,961,745 B2
(45) Date of Patent: May 1, 2018

(54) PRINTED LED RYLENE DYE WELCOME/FAREWELL LIGHTING

(71) Applicant: Ford Global Technologies, LLC, Dearborn, MI (US)

(72) Inventors: Stuart C. Salter, White Lake, MI (US); Paul Kenneth Dellock, Northville, MI (US); Sleiman N. Abdelnour, Macomb, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 14/824,627

(22) Filed: Aug. 12, 2015

(65) Prior Publication Data
US 2015/0343945 A1    Dec. 3, 2015

Related U.S. Application Data

(63) Continuation-in-part of application No. 14/603,636, filed on Jan. 23, 2015, now Pat. No. 9,573,517, which is a continuation-in-part of application No. 14/086,442, filed on Nov. 21, 2013.

(51) Int. Cl.

| | | |
|---|---|---|
| H05B 37/02 | (2006.01) |
| B60Q 1/26 | (2006.01) |
| B60Q 3/68 | (2017.01) |
| B60Q 3/20 | (2017.01) |
| B60Q 3/78 | (2017.01) |
| B60Q 3/80 | (2017.01) |

(52) U.S. Cl.
CPC .......... *H05B 37/0218* (2013.01); *B60Q 1/26* (2013.01); *B60Q 3/20* (2017.02); *B60Q 3/68* (2017.02); *B60Q 3/78* (2017.02); *B60Q 3/80* (2017.02); *H05B 37/0227* (2013.01); *B60Q 2400/40* (2013.01); *Y02B 20/44* (2013.01); *Y02B 20/46* (2013.01)

(58) Field of Classification Search
None
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Dedei K Hammond
(74) *Attorney, Agent, or Firm* — Jason Rogers; Price Heneveld LLP

(57) ABSTRACT

An illumination apparatus for a vehicle is disclosed. The apparatus comprises a lighting device disposed on the vehicle. At least one detection sensor is configured to detect a proximity of an occupant and a controller is configured to identify an approach and a departure of the occupant. The controller is configured to control the lighting device to output a first emission of light in response to the approach and a second emission in response to the departure.

20 Claims, 9 Drawing Sheets

(56) References Cited

U.S. PATENT DOCUMENTS

| | | |
|---|---|---|
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,258,472 B2 | 8/2007 | Tufte |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,220,147 B2 * | 12/2015 | Newton ............ H05B 37/0227 |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0046684 A1 * | 3/2006 | Kameyama ............ B60Q 1/50 |
| | | 455/345 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2010/0171606 A1 | 7/2010 | Law et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| CN | 201193011 Y | 2/2009 |
| CN | 202764817 U | 3/2013 |
| CN | 203431669 U | 2/2014 |
| CN | 204055676 U | 12/2014 |
| CN | 204127823 U | 1/2015 |
| DE | 4120677 A1 | 1/1992 |
| DE | 29708699 U1 | 7/1997 |
| DE | 10319396 A1 | 11/2004 |
| DE | 102006026944 A1 | 12/2007 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014051702 A1 | 4/2014 |
| WO | 2014068440 A1 | 5/2014 |
| WO | 2014161927 A1 | 10/2014 |
| WO | 2015012771 A1 | 1/2015 |

* cited by examiner

PRINTED LED RYLENE DYE WELCOME/FAREWELL LIGHTING

CROSS-REFERENCE TO RELATED APPLICATION

This application is a continuation-in-part of U.S. patent application Ser. No. 14/603,636, filed Jan. 23, 2015, now U.S. Pat. No. 9,573,517, and entitled "DOOR ILLUMINATION AND WARNING SYSTEM," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems having thin profiles that may be operable to conform to non-planar surfaces.

BACKGROUND OF THE INVENTION

Lighting in vehicles traditionally has been applied to provide illumination for reading, vehicle entry, and operation. However, lighting may also be applied to improve vehicle features and systems to ensure that vehicle passengers, operators, and onlookers have an improved experience. Such improvements may arise from improvements in safety, visibility, aesthetics, and/or features. The disclosure provides for a lighting system operable to illuminate a portion of a vehicle and in some embodiments, may alert an operator of the vehicle of a vehicle condition, such as a door ajar condition.

SUMMARY OF THE INVENTION

According to one aspect of the present disclosure, an illumination apparatus for a vehicle is disclosed. The apparatus comprises a lighting device disposed on the vehicle. At least one detection sensor is configured to detect a proximity of an occupant and a controller is configured to identify an approach and a departure of the occupant. The controller is configured to control the lighting device to output a first emission of light in response to the approach and a second emission in response to the departure.

According to another aspect of the present disclosure, vehicle lighting system is disclosed. The system comprises a lighting device, an ambient light sensor, and a detection sensor in communication with a controller. The lighting device is disposed on the vehicle and configured to output an emission of light. The ambient light sensor is configured to output an ambient light signal. The detection sensor is configured to output a detection signal. The controller is configured to identify an occupant proximate the vehicle and activate the emission based on the detection signal. The controller is further configured to control an intensity of the emission based on the ambient light signal.

According to yet another aspect of the present disclosure, a method for controlling at least one vehicle light source is disclosed. The method includes detecting a light intensity of ambient light proximate a vehicle and storing data corresponding to the light intensity. A lighting event may be detected and in response a light source may be activated. The method may continue by calculating an emission intensity of the light source based on the data and activating the light source in response to a lighting event. The controller may activate the light source at the emission intensity. The emission intensity is calculated based on the data to activate the light source based on the lighting condition having occurred at a previous time.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The disclosure provides for novel systems and methods configured to illuminate at least a portion of a vehicle based on a detection of an approaching occupant or object approaching the vehicle. In the various embodiments, the disclosure provides for various systems and methods configured to detect, activate, and control an illumination apparatus. In an exemplary embodiment, the disclosure provides for a system configured to identify an approaching or departing occupant of a vehicle and illuminate at least a portion of the vehicle in first color or a second color. The first color may correspond to a warm white light configured to greet an approaching occupant and the second color may correspond to a cool white light configured to bid farewell to a departing occupant.

The disclosure provides for various examples of illumination apparatuses having light producing assemblies, some of which may be disposed on or in connection with various vehicle fixtures. A light producing assembly may correspond to a thin, flexible lighting assembly, which may be utilized in a variety of applications. For purposes of this disclosure, a vehicle fixture may refer to any interior or exterior portion of vehicle equipment, or part thereof, suitable for receiving the illumination apparatus described herein. While the implementation of the illumination apparatus described herein is primarily directed towards automotive vehicle use, it should be appreciated that the apparatus or system may also be implemented in other types of vehicles designed to transport one or more passengers such as, but not limited to, watercraft, trains, and aircraft.

Figure 1:
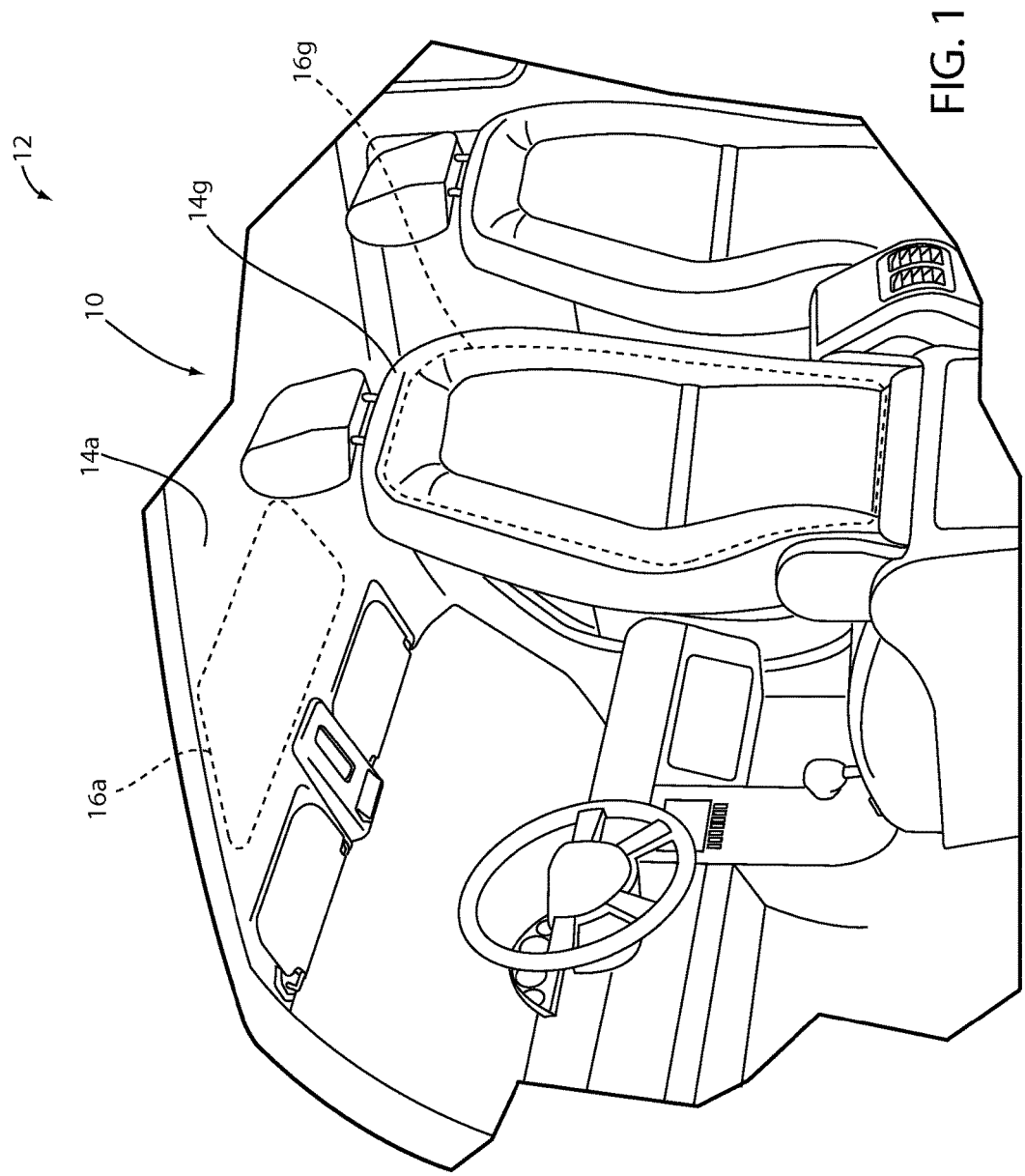
FIG. 1 is a perspective view of a front passenger compartment of an automotive vehicle having various illuminated fixtures.
Figure 2:
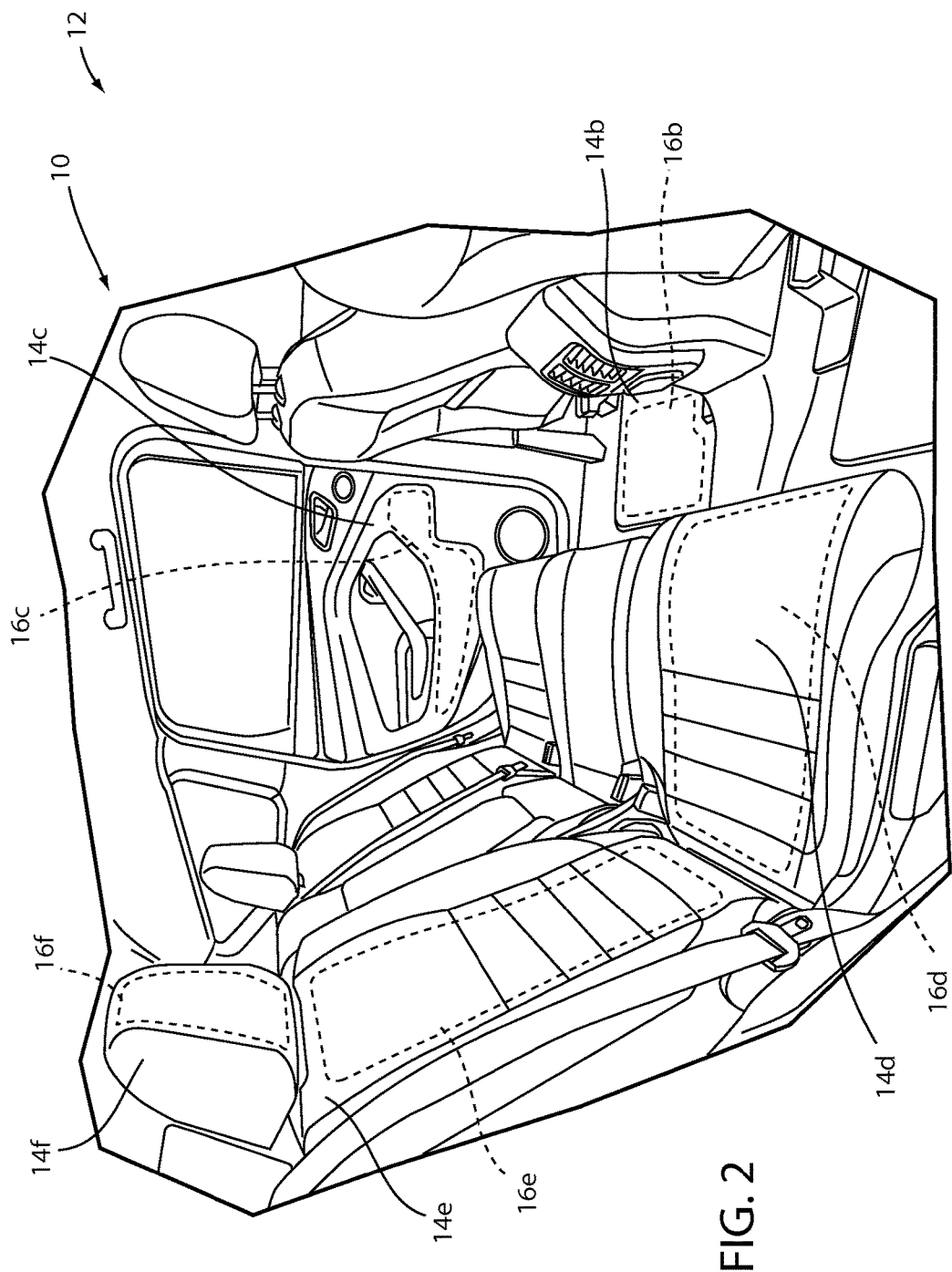
FIG. 2 is a perspective view of a rear passenger compartment of an automotive vehicle having various illuminated fixtures.

Referring to FIGS. 1 and 2, a passenger compartment 10 of an automotive vehicle 12 is generally shown having a variety of exemplary interior fixtures 14a-14g located in the front and rear of the passenger compartment 10. The interior fixtures 14a-14g generally correspond to a headliner 14a, a floor mat 14b, a door trim panel 14c, and various parts of a seat including a seat base 14d, a backrest 14e, a headrest 14f, and a seat back 14g, respectively. For purposes of illustration, and not limitation, each fixture 14a-14g may be configured to receive a light producing assembly, as further discussed herein. A light producing assembly may be disposed on a selected area 16a-16g of each fixture 14a-14g. The vehicle 12 may comprise a plurality of light producing assemblies which may be utilized independently or in combination to provide functional and/or decorative lighting for the vehicle 12.

With respect to the illumination apparatus described herein, it should be appreciated that the selected area 16a-16g is not limited to any particular shape or size and may include portions of a fixture having planar and/or non-planar configurations. For example, in an exemplary embodiment, the light producing assembly may have a thin profile and be of flexible materials providing for the assembly to conform to non-planar surfaces. Although some fixtures 14a-14g have been exemplarily provided, it should be appreciated that other fixtures may be used in accordance with the vehicle lighting system described herein. Such fixtures may include instrument panels and components thereon, interactive mechanisms (e.g. push buttons, switches, dials, and the like), indicating devices (e.g. speedometer, tachometer, etc.), printed surfaces, and various interior and/or exterior portions of the vehicle 12, which may be of metallic, polymeric, or a variety of materials.

Figure 3:
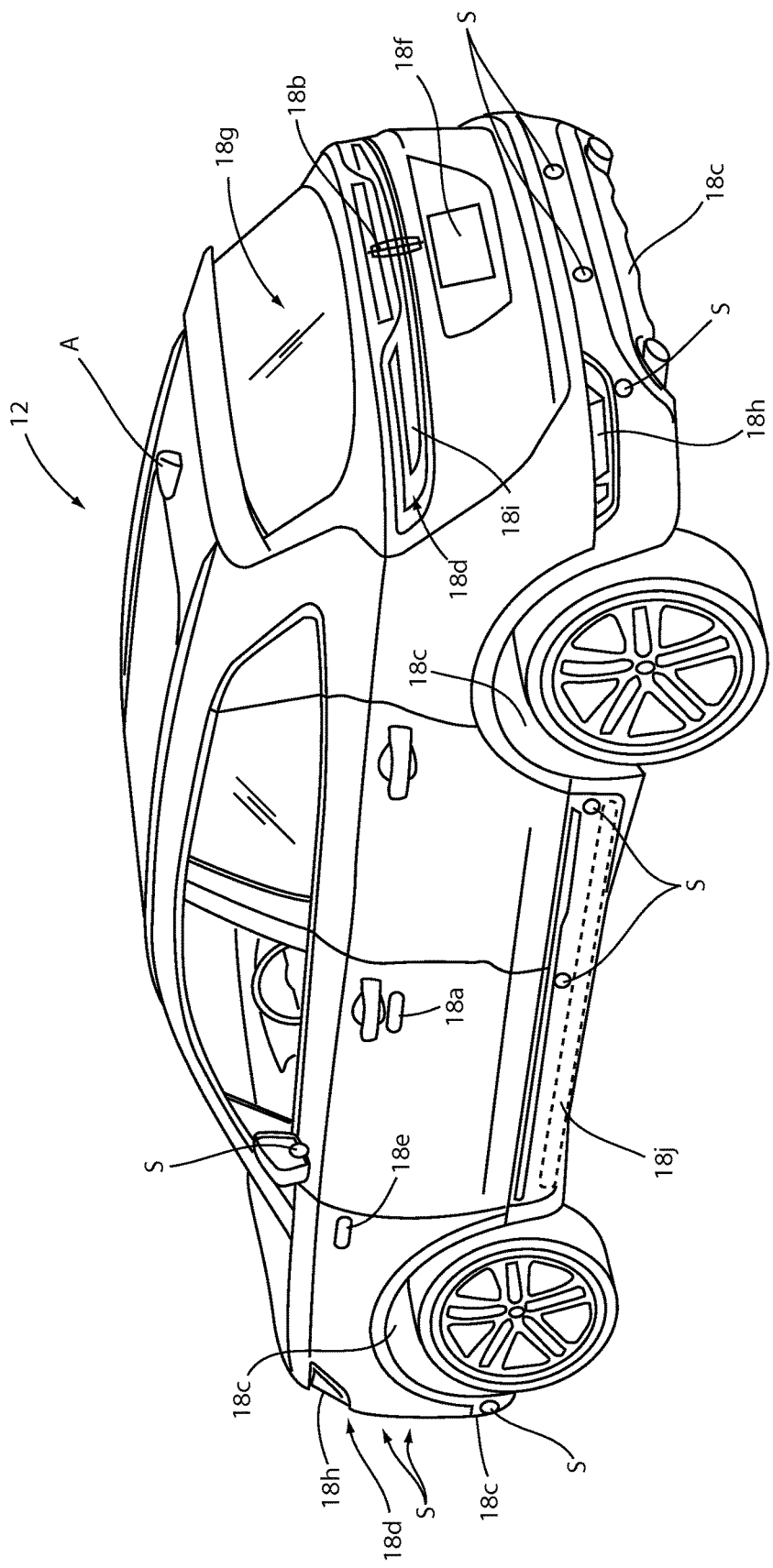
FIG. 3 is a perspective view of an exterior of an automotive vehicle having various illuminated fixtures.

Referring to FIG. 3 a perspective view of an exterior of the vehicle 12 is shown. In addition to interior fixtures, the light producing assemblies as discussed herein may be utilized to accent, supplement, and/or replace various exterior panels or exterior fixtures 18a-18h. Examples of exterior fixtures 18a-18j may include, but are not limited to, keyless entry buttons 18a, badges 18b, wheel well lights 18c, turn indicators 18d, side markers 18e, license plate lamps 18f, cargo area lamps 18g, headlights 18h, taillights 18i, fog lights, puddle lamps, side rail lamps 18j, trim lamps, etc. In an exemplary embodiment, one or more of the interior or exterior fixtures described herein may provide various functions lighting functions. Some such functions may correspond to lighting that may illuminate in response to the approach and/or departure of an operator or occupant of the vehicle 12. The lighting functions may provide for improved aesthetics of the vehicle 12 and may also decrease manufacturing costs that may be associated with previously known lighting systems.

One or more of the light producing assemblies discussed herein may be in communication with a controller. In some implementations, the controller may further be in communication with a vehicle control module. The vehicle control module may provide signals to the controller in response to various user inputs, vehicle operating information, vehicle status information, etc. In response to one or more signals received from the vehicle control module, the controller may be configured to control the illumination apparatus to illuminate one or more of the light producing assemblies to provide various lighting functions for the vehicle 12. Further details regarding the controller and the vehicle control module are discussed in reference to FIG. 9. Though the light producing assemblies discussed herein are described as being in communication with the controller, one or more of the assemblies may be controlled by various forms of switches and/or analog or digital circuitry.

Figure 4:
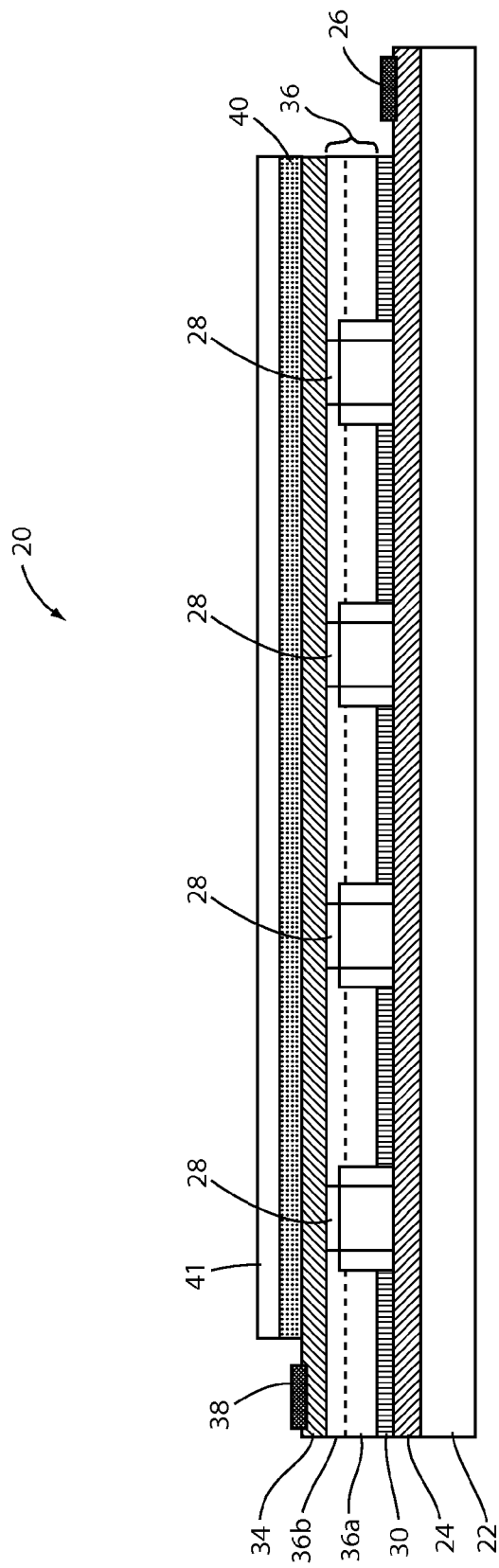
FIG. 4 is a detailed side view of a light producing assembly comprising a photoluminescent layer.

Referring to FIG. 4, the light producing assembly 20 may correspond to a thin-film or printed light emitting diode (LED) assembly. The light producing assembly 20 may comprise a substrate 22. The substrate 22 may be opaque, transparent, or semi-transparent and may be thin. The light producing assembly 20 may be utilized in a variety of applications, which may require a thin overall thickness. The substrate 22 may be of a polymer, for example polycarbonate, poly-methyl methacrylate (PMMA), polyethylene terephthalate (PET), etc. In some embodiments, the substrate 22 may be dispensed from a roll to provide for integration into assembly operations for the light producing assembly 20 and may be approximately 0.005 to 0.060 inches thick.

A first electrode 24 or conductive layer may be disposed on the substrate 22. The first electrode 24 and/or various electrodes or conductive layers discussed herein may comprise a conductive epoxy, such as a silver-containing or copper-containing epoxy. The first electrode 24 is conductively connected to a first bus bar 26. The first bus bar 26 and other bus bars or conduits discussed herein may be of metallic and/or conductive materials which may be screen printed on the electrodes or conductive layers. Bus bars may be utilized in the light producing assembly 20 to conductively connect a plurality of light-emitting diode (LED) sources 28 to a power source. In this way, the first bus bar 26, and other bus bars utilized in the light producing assembly, may be configured to uniformly deliver current along and/or across a surface of the light producing assembly 20.

The LED sources 28 may be printed, dispersed or otherwise applied to the first electrode 24 via a semiconductor ink 30. The LED sources 28 may be dispersed in a random or controlled fashion within the semiconductor ink 30. The LED sources 28 may correspond to micro-LEDs of gallium nitride elements, which may be approximately 5 microns to 400 microns across a width substantially aligned with the surface of the first electrode. The semiconductor ink 30 may include various binding and dielectric materials including but not limited to one or more of gallium, indium, silicon carbide, phosphorous and/or translucent polymeric binders. In this configuration, the semiconductor ink 30 may contain various concentrations of LED sources 28 such that a surface density of the LED sources 28 may be adjusted for various applications.

In some embodiments, the LED sources 28 and semiconductor ink 30 may be sourced from Nth Degree Technologies Worldwide Inc. The semiconductor ink 30 can be applied through various printing processes, including ink jet and silk screen processes to selected portion(s) of the substrate 22. More specifically, it is envisioned that the LED sources 28 are dispersed within the semiconductor ink 30, and shaped and sized such that a substantial quantity of them preferentially align with the first electrode 24 and a second electrode 34 during deposition of the semiconductor ink 30. The portion of the LED sources 28 that ultimately are electrically connected to the electrodes 24, 34 may be illuminated by a voltage source applied across the first electrode 24 and the second electrode 34. In some embodiments, a power source operating at 12 to 16 VDC from a vehicular power source may be employed as a power source to supply current to the LED sources 28. Additional information regarding the construction of a light producing assembly similar to the light producing assembly 20 is disclosed in U.S. Pat. No. 9,299,887 to Lowenthal et al., entitled "ULTRA-THIN PRINTED LED LAYER REMOVED FROM SUBSTRATE," filed Mar. 12, 2014, the entire disclosure of which is incorporated herein by reference.

At least one dielectric layer 36 may be printed over the LED sources 28 to encapsulate and/or secure the LED sources 28 in position. The at least one dielectric layer 36 may correspond to a first dielectric layer 36a and a second dielectric layer 36b, which may be of a transparent material. The second electrode 34 may correspond to a top transparent conductor layer printed over the dielectric layer 36 to electrically connect the electrodes 24, 34. The second electrode 34 is conductively connected to a second bus bar 38. The bus bars 26, 38 may be utilized in the light producing assembly 20 to conductively connect a plurality of light-emitting diode (LED) sources 28 to the power source.

In some embodiments, the first electrode 24 and the second electrode 34 may correspond to a cathode electrode and an anode electrode, respectively. Though described as a cathode and an anode of the light producing assembly 20, the first electrode 24 and the second electrode 34 may be arranged such that the second electrode 34 (anode) is disposed on the substrate and the first electrode 24 (cathode) is disposed on the at least one dielectric layer 36. The bus bars 26, 38 may be printed along opposite edges of the electrodes 24, 34 and electrically terminate at anode and cathode terminals. Points of connection between the bus bars 26, 38 and the power source may be at opposite corners of each bus bar 26, 38 for uniform current distribution along each bus.

Still referring to FIG. 4, a photoluminescent layer 40 may be applied to the second electrode 34. The photoluminescent layer may be applied as a coating, layer, film, and/or photoluminescent substrate. The photoluminescent layer 40 may be applied by screen printing, flexography, and/or otherwise affixed to the second electrode 34. In various implementations, the LED sources 28 may be configured to emit an excitation emission comprising a first wavelength corresponding to blue light. The LED sources 28 may be configured to emit the excitation emission into the photoluminescent layer 40 such that the photoluminescent material becomes excited. In response to the receipt of the excitation emission, the photoluminescent material converts the excitation emission from the first wavelength to an output emission comprising at least a second wavelength longer than the first wavelength. Additionally, one or more coatings 41 or sealing layers may be applied to an exterior surface of the light producing assembly 20 to protect the photoluminescent layer 40 and various other portions of the assembly 20 from damage and wear.

Figure 5:
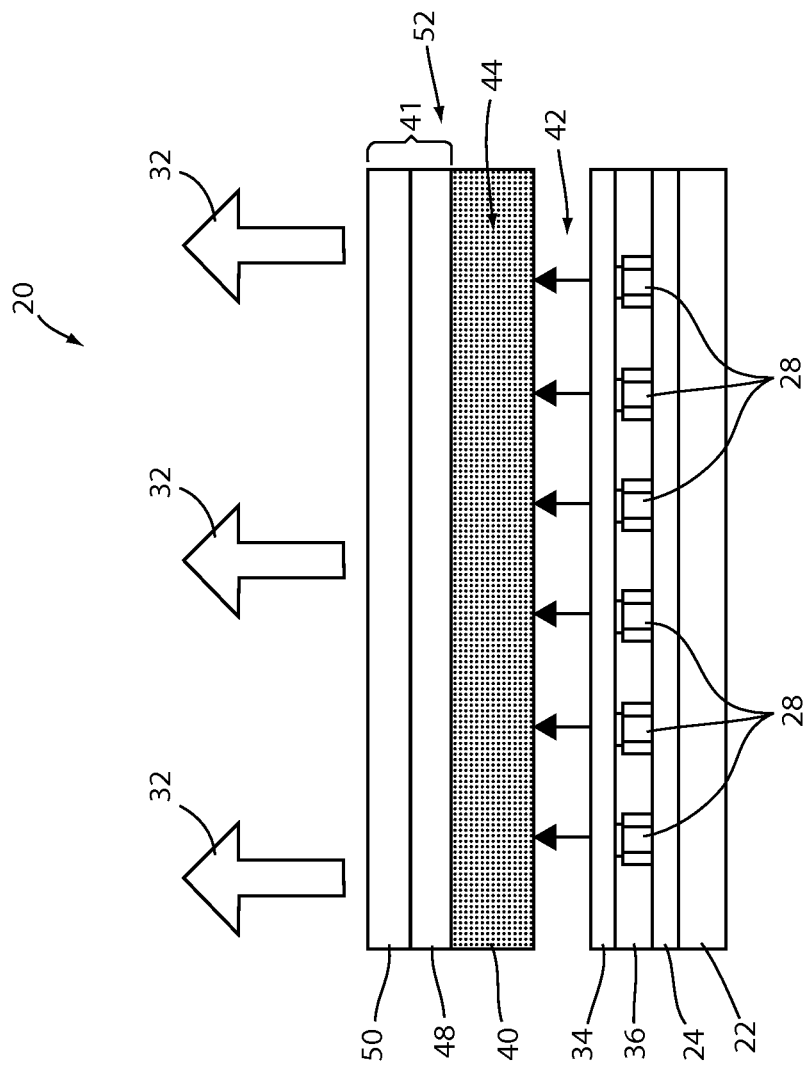
FIG. 5 is a side view of a light producing assembly demonstrating a photoluminescent layer configured to convert a wavelength of light.

Referring now to FIG. 5, a detailed view of photoluminescent layer 40 of the light producing assembly 20 is shown. The light producing assembly 20 is configured similar to the light producing assembly 20 demonstrated in FIG. 4, with like-numbered elements having the same or comparable function and structure. Though not shown in FIG. 5, the LED sources 28 are in electrical communication with the electrodes 24, 34 and a power source such that an excitation emission may be output from LED sources 28.

In an exemplary implementation, the excitation emission 42 may correspond to an excitation emission having a first wavelength corresponding to a blue, violet, and/or ultraviolet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 42 is transmitted into an at least partially light transmissive material of the photoluminescent layer 40. The excitation emission is emitted from the LED sources 28 and may be configured such that the first wavelength corresponds to at least one absorption wavelength of one or more photoluminescent materials disposed in the photoluminescent layer 40. For example, the photoluminescent layer 40 may comprise an energy conversion layer 44 configured to convert the excitation emission 42 at the first wavelength to an output emission 32 having a second wavelength, different from the first wavelength. The output emission 32 may comprise one or more wavelengths, one of which may be longer than the first wavelength. The conversion of the excitation emission 42 to the output emission 32 by the energy conversion layer 44 is referred to as a Stokes shift.

In some embodiments, the output emission 32 may correspond to a plurality of wavelengths. Each of the plurality of wavelengths may correspond to significantly different spectral color ranges. For example, the at least second wavelength of the output emission 32 may correspond to a plurality of wavelengths (e.g. second, third, etc.). In some implementations, the plurality of wavelengths may be combined in the output emission 32 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength and approximately 430-525 nm. The plurality of wavelengths may be utilized to generate a wide variety of colors of light from each of the photoluminescent portions converted from the first wavelength. Though the particular colors of red, green, and blue are referred to herein, various photoluminescent materials may be utilized to generate a wide variety of colors and combinations to control the appearance of the output emission 32.

The photoluminescent materials, corresponding to the photoluminescent layer 40 or the energy conversion layer 44, may comprise organic or inorganic fluorescent dyes configured to convert the excitation emission 42 to the output emission 32. For example, the photoluminescent layer 40 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 40 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 42 configured to excite one or more photoluminescent materials to emit an output emission having a desired color.

Still referring to FIG. 5, the light producing assembly 20 may further include the coating 41 as at least one stability layer 48 configured to protect the photoluminescent material contained within the energy conversion layer 44 from photolytic and/or thermal degradation. The stability layer 48 may be configured as a separate layer optically coupled and adhered to the energy conversion layer 44. The stability layer 48 may also be integrated with the energy conversion layer 44. The photoluminescent layer 40 may also optionally include a protection layer 50 optically coupled and adhered to the stability layer 48 or any layer or coating to protect the photoluminescent layer 40 from physical and chemical damage arising from environmental exposure.

The stability layer 48 and/or the protection layer 50 may be combined with the energy conversion layer 44 to form an integrated photoluminescent structure 52 through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 52. Once formed, the photoluminescent structure 52 may be applied to a surface of at least one of the electrodes 24, 34 such that the excitation emission 42 received from the LED sources 28 is converted to the output emission 32. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

In some embodiments, the coating 41 may further comprise a colored layer applied to the light producing assembly 20 and configured to control or adjust an appearance of the light producing assembly 20 in an unilluminated state. As shown in FIG. 5, the colored layer may correspond to reference numerals 48 and/or 50. The colored layer may comprise an at least partially light transmissible polymeric layer or coating that may be applied to an outer surface of the light producing assembly 20. The colored layer may be tinted any color to suit a desired appearance of the light producing assembly 20.

Figure 6:
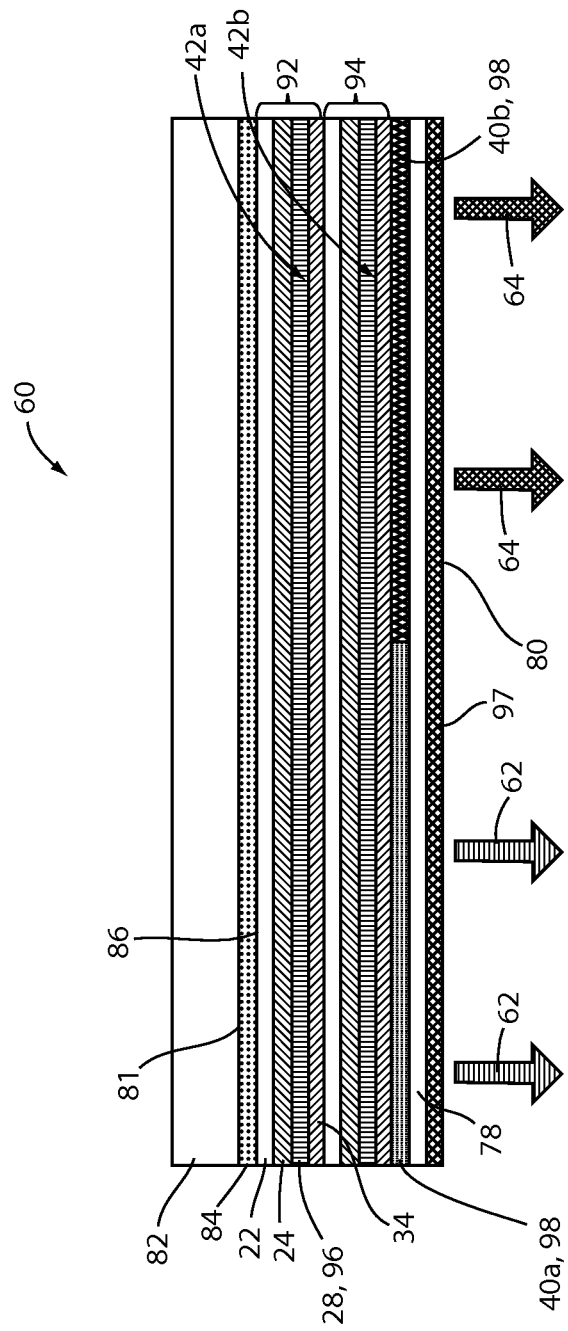
FIG. 6 is a side view of an exemplary embodiment of a light producing assembly.

Referring now to FIG. 6, an exemplary embodiment of a light producing assembly 60 is described. The light producing assembly 60 may be configured to emit a first output emission 62, which may correspond to the output emission 32, and a second output emission 64. In some embodiments, the first output emission 62 and the second output emission 64 are emitted in response to the activation of at least one excitation emission, for example, the excitation emission 42. Though the light producing assembly 60 is discussed in reference to a particular embodiment, light producing assemblies may comprise various features, characteristics, and/or constructions without departing form the spirit of the disclosure.

The light producing assembly 60 may be configured to emit the first output emission 62 and the second output emission 64 independently. In order to provide for the independent activation of the first output emission 62 and the second output emission 64, the controller may be in communication with a first stacked emitting layer 92 and a second stacked emitting layer 94 of the light producing assembly 60. Each of the stacked emitting layers may comprise similar elements to the light producing assembly 20 having similar portions like-numbered for clarity.

The light producing assembly 60 is shown in connection with at least one of an interior or exterior surface 81, which may correspond to at least one panel or fixture 82 of the vehicle 12. The light producing assembly 60 may be affixed to the exterior surface 81 by an adhesive layer 84. The adhesive layer 84 may correspond to various forms of adhesive, for example acrylic adhesive, epoxy adhesive, etc. In this way, the light producing assembly 60 may be affixed to the exterior surface 81 substantially flush with one or more class-A surfaces of the at least one panel or fixture of the vehicle 12.

A mounting surface 86 of the light producing assembly 60 may correspond to the substrate 22 or a film layer. The substrate 22 may correspond to a layer of dielectric material configured to protect and electrically insulate at least one emitting layer of the light producing assembly 60. In an exemplary embodiment, the light producing assembly 60 comprises a plurality of emitting layers in a stacked configuration. In this configuration, a first stacked emitting layer 92 and a second stacked emitting layer 94 may be incorporated in the light producing assembly to control a color of light or emissions output from the assembly.

Each of the stacked emitting layers 92 and 94 may comprise the first electrode 24 and the second electrode 34 with a printed LED layer 96 comprising the LED sources 28 printed on a surface therebetween. The printed LED layer 96 may be applied to at least one of the electrodes via a liquid suspension comprising a concentration of the LED light sources 28 dispersed therein. The controller may be operable to activate excitation emissions 42a and 42b from each of the printed LED layers 96 corresponding to each of the first stacked emitting layer 92 and the second stacked emitting layer 94 respectively. The controller may selectively activate the stacked emitting layers 92 and 94 by delivering signals communicated by bus bars similar to the first bus bar 26 and the second bus bar 38.

The first stacked emitting layer 92 may be configured to generate the first excitation emission 42a to illuminate a first photoluminescent portion 40a in the first output emission 62. The second stacked emitting layer 94 may be configured to generate the second excitation emission 42b to illuminate the second photoluminescent portion 40b in the second output emission 64. In this configuration, the light producing assembly 60 may be operable to independently illuminate a first portion of an emission surface 97 in a first color of light by emitting the first output emission 62. The light producing assembly 60 may also be operable to illuminate a second portion of the emission surface 97 in a second color of light by emitting the second output emission 64. Additionally, in some implementations, the light producing assembly 60 may be configured to shift or adjust a color of a combined output emission 62 and 64 from the emission surface 96.

In the stacked configuration, each of the stacked emitting layers 92 and 94 may be of substantially light transmissive materials such that the first excitation emission 42*a* may be transmitted through the second stacked emitting layer 94. For example, the electrodes may be of indium tin oxide (ITO) and the at least one dielectric layer 36 of the printed LED layer 96 may be of a light emissive polymer and graphene. In this configuration, each of the excitation emissions may be emitted into the photoluminescent portions 40*a* and 40*b* to generate the output emissions 62 and 64.

The output emissions 62 and 64 may be generated by each of the photoluminescent materials in the energy conversion layers of the corresponding photoluminescent portions 40*a* and 40*b*. Each of the stacked emitting layers 92 and 94 may be configured to emit the excitation emissions 42*a* and 42*b* at similar wavelengths or substantially different wavelengths. The wavelength output by the LED sources 28 corresponding to each of the stacked emitting layers 92 and 94 may be configured to align with an absorption range of one or more photoluminescent materials utilized in each of the respective photoluminescent portions 40*a* and 40*b*. In this configuration, the controller may activate the first stacked emitting layer 92 to emit the excitation emission 42*a* to excite the first photoluminescent portion 40*a* and activate the second stacked emitting layer 94 to emit the excitation emission 42*b* to excite the second photoluminescent portion 40*b*.

In some implementations, the first photoluminescent portion 40*a* and the second photoluminescent portion 40*b* may correspond to a combined photoluminescent layer 98. The combined photoluminescent layer 98 may comprise one or more photoluminescent materials configured to have substantially different absorption ranges. For example, a first photoluminescent material may have a first absorption range configured to become excited in response to receiving the first excitation emission 42*a*. In response to receiving the first excitation emission 42*a*, the combined photoluminescent layer 98 may emit the first output emission 62 in the first color.

A second photoluminescent material may have a second absorption range configured to become excited in response to receiving the second excitation emission 42*b*. In response to receiving the second excitation emission 42*b*, the combined photoluminescent layer 98 may emit the second output emission 64 in the second color different from the first color. The second absorption range may be significantly different from the first absorption range such that the first absorption range and the second absorption range do not significantly overlap. In this way, each of the stacked emitting layers 92 and 94 may illuminate the combined photoluminescent layer 98. In this configuration, the combined photoluminescent layer 98 may be configured to emit each of the output emissions 62 and 64 substantially independently.

When utilizing the combined photoluminescent layer 98 in the light producing assembly 60, the portion of the illumination apparatus from which the first output emission 62 and the second output emission 64 are emitted may coincide. That is, the light producing assembly 60 may be configured to selectively emit the first output emission 62 and the second output emission 64 from an emission surface 97 of the light producing assembly 60 such that the first output emission 62 and the second output emission 64 may be output from substantially the same surface. In this configuration, a single portion of a lighting apparatus as discussed herein may be configured to selectively emit the first output emission 62 in a first color and the second output emission 64 in a second color. Such an assembly 60 may be operable to utilize a portion of the lighting apparatus to selectively output the first output emission 62 as a warm white light (e.g. reddish or yellowish white light) in response to an approach of an operator or occupant of the vehicle 12. Additionally, the assembly 60 may be operable to utilize the same portion of the lighting apparatus to selectively output the second output emission 64 as a cool white light (e.g. bluish or greenish white light) in response to a departure of an operator or occupant of the vehicle 12.

Figure 7:
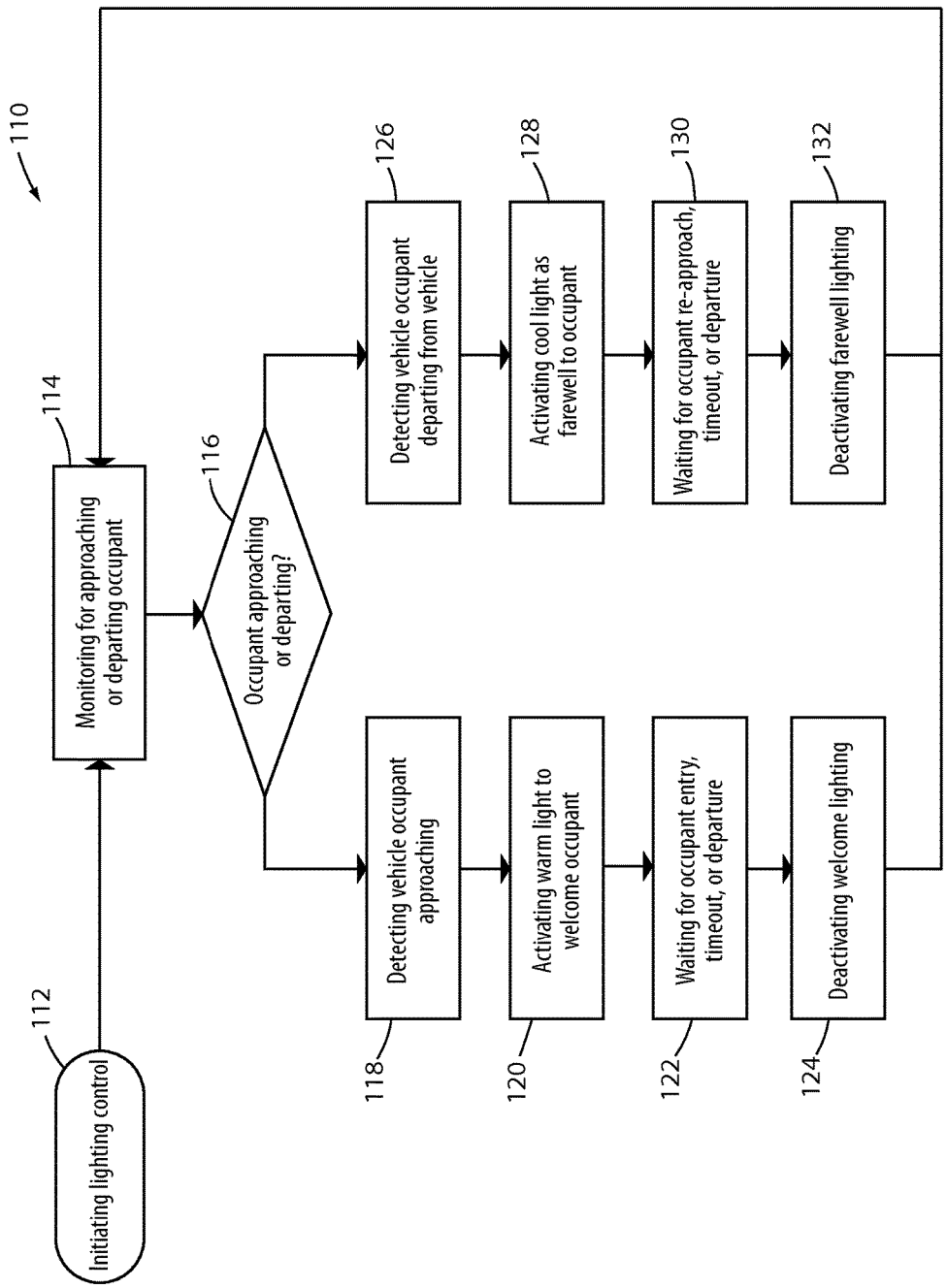
FIG. 7 is a flow chart of a method for controlling an illumination apparatus.

Referring now to FIG. 7, a flow chart of a method 110 for controlling an illumination apparatus comprising a light producing assembly is shown. The light producing assembly may correspond to the light producing assemblies 20 and 60 as discussed herein or any light producing assembly. The light producing assemblies may be implemented on the selected areas 16*a*-16*g* of the interior fixtures 14*a*-14*g*, exterior fixtures 18*a*-18*j*, and various surfaces or portions of surfaces of the vehicle 12. In this configuration, the disclosure provides for a lighting system configured to produce attractive accent lighting emitted from various portions of the vehicle 12.

The method 110 may begin by initializing a lighting control system (112). The lighting control system may be initialized during a startup routine or sequence controlled by a controller as discussed herein. Further details regarding the controller are discussed in reference to FIG. 9. Once initialized, the controller may monitor a region proximate the vehicle 12 for a lighting event, for example an approaching or departing vehicle occupant (114). The controller may detect and/or identify the approaching or departing occupant by identifying a proximity of a proximity device, for example, a fob, key, or other device, that may be detected by a proximity sensor in communication with the controller. The proximity sensor may correspond to a radio frequency proximity sensor operable to identify a range or distance of the proximity device relative the vehicle 12. In response to the detection of the proximity device, the controller may be operable to identify if an occupant of the vehicle is approaching or departing (116).

The controller may also be operable to identify a lighting event if an occupant of the vehicle 12 is in proximity to the vehicle 12 via at least one of an imager or intuitive lighting control. For example, if the controller is in communication with one or more cameras or imagers configured to survey an area proximate the vehicle 12, the controller may utilize image data received from the imager to identify an object corresponding to an approaching occupant of the vehicle 12. Additionally, the controller may utilize a signal received via a communication bus to identify that a door or closure of the vehicle 12 is opened or otherwise accessed (e.g. a key pad is manipulated, handle moved, etc.). Based on the closure of the vehicle 12 being accessed, the controller may assume that the occupant is approaching based on an interior or exterior handle being accessed, an ignition event, or a variety of additional vehicle states that may be communicated to the controller. As such, the method may utilize a variety of signals corresponding to various signals received by the controller to identify an approaching or departing occupant of the vehicle 12.

If in decision step 116 the controller identifies that an occupant is approaching, the method 110 may continue to step 118. Upon detection of the approaching occupant in step 118, the controller may activate an output emission (e.g.

output emission 32, the first output emission 62). Based on the approaching occupant being detected, the controller may selectively output the first output emission 62 as a warm white light (e.g. reddish or yellowish white light) to provide a warm welcoming light to the approaching occupant (120). The controller may maintain the first output emission 62 for a waiting period, which may correspond to the controller identifying that the occupant has entered the vehicle (e.g. via a door sensor), a predetermined time interval lapsing, and/or a detection that the occupant has departed from the vehicle 12 (122). Following step 122, the controller may deactivate the first output emission 62 and return to step 114 (124).

If in decision step 116 the controller identifies that an occupant is departing from the vehicle 12, the method 110 may continue to step 126. Upon detection of the departing occupant in step 126, the controller may activate an output emission (e.g. output emission 32, the second output emission 64). Based on the departing occupant being detected, the controller may selectively output the first output emission 62 as a cool white light (e.g. bluish or greenish white light) to provide a cool light for the departing occupant (128). The controller may maintain the second output emission 64 for a waiting period, which may correspond to the controller identifying that the occupant has entered the vehicle (e.g. via a door sensor), a predetermined time interval lapsing, and/or a detection that the occupant has departed from the vehicle 12 (130). Following step 130, the controller may deactivate the first output emission 62 and return to step 114 (132).

Figure 8:
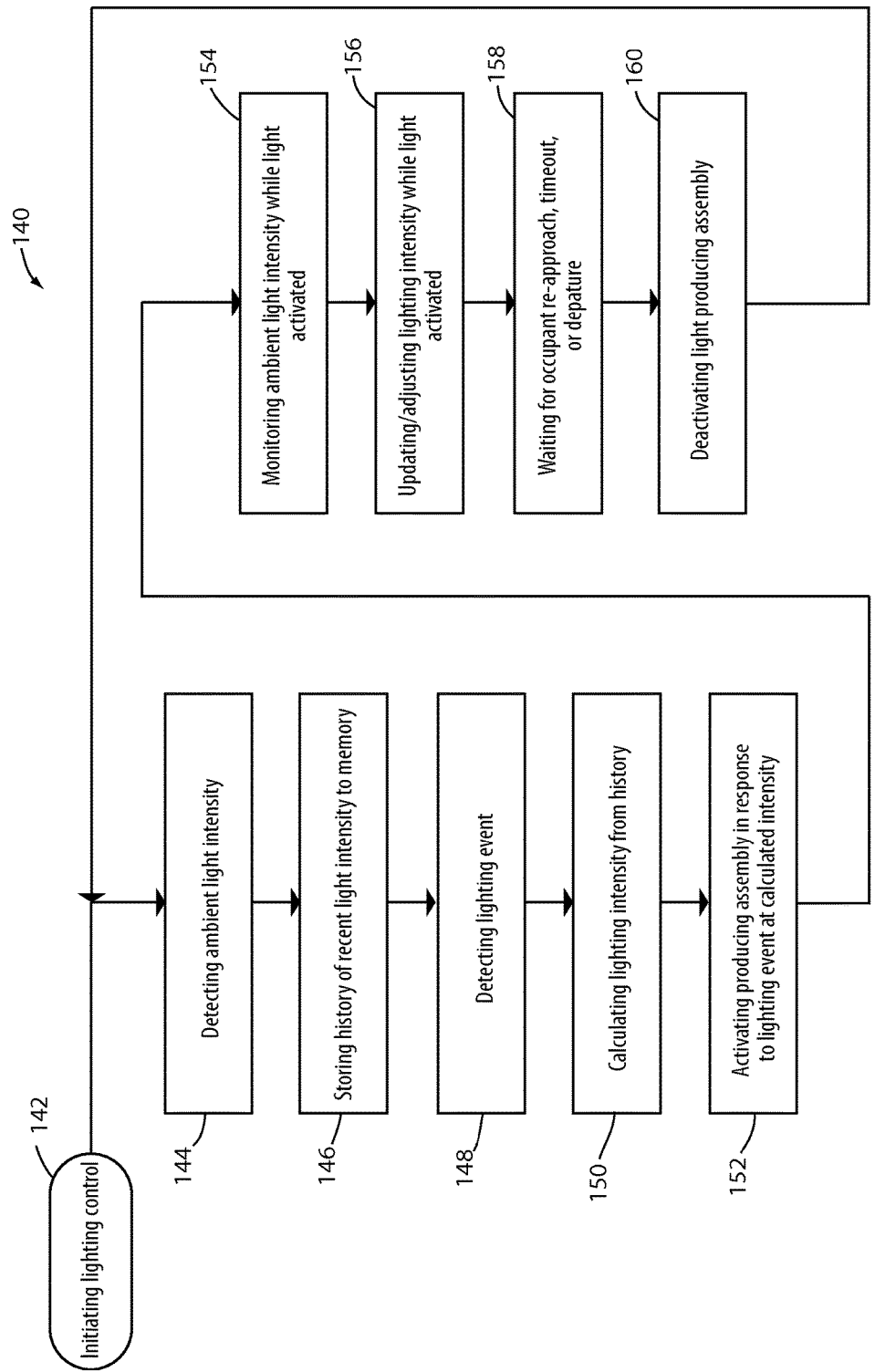
FIG. 8 is a flow chart of a method for controlling an illumination apparatus.

Referring now to FIG. 8, a flow chart of a method 140 for controlling an illumination apparatus comprising a light producing assembly is shown. The light producing assembly may correspond to the light producing assemblies 20 and 60 as discussed herein or any light producing assembly. The light producing assemblies may be implemented on the selected areas 16a-16g of the interior fixtures 14a-14g, exterior fixtures 18a-18j, and various surfaces or portion of surfaces of the vehicle 12. In this configuration, the disclosure provides for a lighting system configured to produce attractive accent lighting emitted from various portions of the vehicle 12.

The method 140 may begin by initializing a lighting control system (142). The method 140 may correspond to an intuitive lighting control. The lighting control system may be initialized during a startup routine or sequence controlled by a controller as discussed herein. Further details regarding the controller are discussed in reference to FIG. 9. Once initialized, the controller may detect a light intensity from an ambient light sensor as an ambient light signal (144). The controller may store a history of light intensity measurements from the ambient light signal to memory (146). The controller may then detect a lighting event (148). A lighting event may correspond to opening or accessing a door of the vehicle 12, detecting an occupant in proximity to the vehicle 12, and various other methods of detection and activation in relation to a state of the vehicle 12, which may be communicated to the controller via the communication bus.

Upon detecting the lighting event, the controller may calculate an intensity of an output emission (e.g. the output emission 32, the first output emission 62 and/or the second output emission 64) based on the history of light from the ambient light signal (150). With the intensity of the light calculated, the controller may activate the illumination apparatus, which may comprise a light producing assembly (e.g. the light producing assemblies 20 and 60) (152). The lighting intensity may be calculated corresponding to an ambient lighting intensity over a recent temporal period. The temporal period may correspond to a time required for a human eye to acclimate or adjust to an illumination level that has changed.

For example, the temporal period may correspond to a predetermined period occurring prior to a lighting event in step 148. The temporal period may correspond to a time duration of approximately the preceding 1-7 minutes before the lighting event. Additionally, the time duration may be approximately 5 minutes. In an exemplary implementation, the controller may calculate the duration based on a change in a level of the ambient light as determined based on the history of the ambient light level. In various embodiments, the controller may be configured to calculate the light intensity of the output emissions to be brighter if the temporal period preceding the lighting event corresponds to a brighter ambient light than a current ambient light level. Additionally, the controller may be configured to calculate the light intensity of the output emissions to be darker or less bright if the temporal period preceding the lighting event corresponds to a dimmer or less bright ambient light than a current ambient light level. In this configuration, the controller may be operable to control an illumination apparatus to emit comfortable lighting based on a previous ambient lighting level preceding a lighting event.

While the illumination apparatus is activated, the controller may continue to monitor the ambient light intensity via the ambient light signal (154). Based on the ambient light signal, the controller may update or adjust the intensity of the light emitted from the illumination apparatus (156). For example, the controller may increase the intensity if the ambient light level increases and decrease the intensity if the ambient light level decreases. In this configuration, the illumination apparatus may adjust the intensity of the output emissions discussed herein based on real-time changes in the ambient lighting and/or adjust the intensity in a delayed configuration to provide for the eyes of one or more persons proximate the vehicle 12 to acclimate to the ambient lighting conditions measured by the ambient light sensor in a present lighting condition.

The method 140 may further continue to control the intensity of the output emissions until the controller identifies a time-out of an activation period or a lighting event, for example a departure or approach of an occupant of the vehicle 12 (158). Upon timeout, the controller may deactivate the illumination apparatus and return to step 144 to continue monitoring the ambient light intensity (160). The disclosure provides for various methods and systems to control at least one lighting function of an illumination apparatus for a vehicle. The various methods and steps discussed herein may be implemented in various combinations without departing from the spirit of the application to provide flexible solutions for illuminating a vehicle.

In an exemplary embodiment, the controller may be in communication with a rain sensor configured to detect the presence of rain. For example, the vehicle 12 may be equipped with rain sensing wipers having a rain sensor configured to detect rain on the windshield of the vehicle 12. The detection of rain may be communicated to the controller via the communication bus. The rain sensor may correspond to an optical/infrared sensor disposed proximate the windshield of the vehicle 12. In response to the rain sensor detecting that rain is present in an operating environment of the vehicle 12, the controller may increase the level or intensity of the output emission. The intensity of the output emission may be increased by the controller for a predetermined time after the rain is detected.

The methods and systems described herein provide various light sources and control schemes configured to provide lighting that is both visually appealing and also emitted at an intensity that is comfortable to an onlooker of the vehicle 12. For example, the intensity of the output emissions may be lower in environmental conditions having a lower ambient light level. The intensity of the output emissions may increase based on the increased ambient light, a detection of rain, and various other conditions discussed herein. In this way, the disclosure provides for various novel systems to provide lighting for the vehicle 12.

Figure 9:
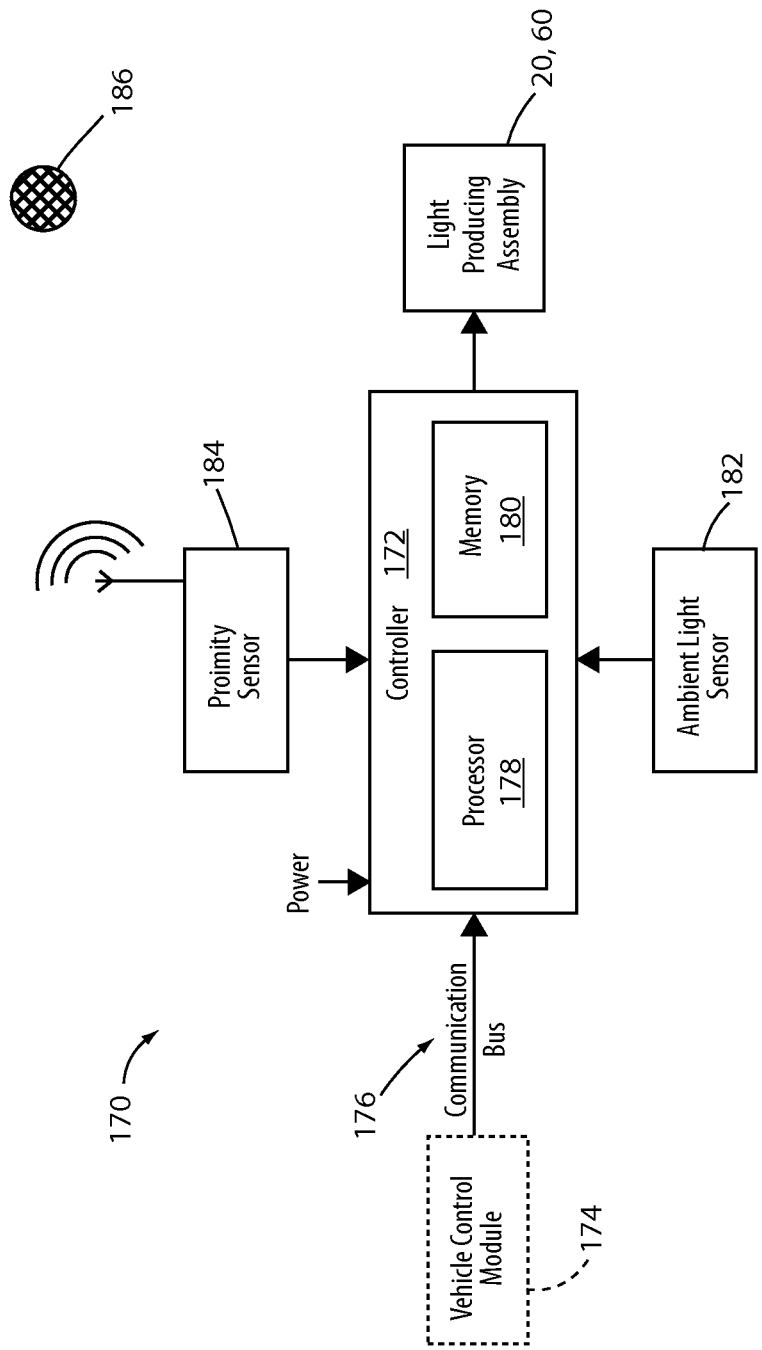
FIG. 9 is a block diagram of a lighting apparatus configured to control the illumination of a light producing assembly.

Referring to FIG. 9, a block diagram of a lighting apparatus 170 or system comprising the light producing assembly 20 and/or 60 is shown. The controller 172 is in communication with the light assembly via the electrode terminals. The controller 172 may be in communication with the vehicle control module 174 via a communication bus 176 of the vehicle. The communication bus 176 may be configured to deliver signals to the controller 172 identifying various vehicle states. For example, the communication bus 176 may be configured to communicate to the controller 172 a drive selection of the vehicle, an ignition state, a door open or ajar status, a remote activation of the light producing assembly 20, or any other information or control signals that may be utilized to activate or adjust the output emission 32, 62, and/or 64. Though the controller 172 is discussed herein, in some embodiments, the light producing assembly 20 may be activated in response to an electrical or electro-mechanical switch in response to a position of the closure of the vehicle 12.

The controller 172 may comprise a processor 178 having one or more circuits configured to receive the signals from the communication bus 176 and output signals to control the light producing assembly 20 to emit the output emission 32. The processor 178 may be in communication with a memory 180 configured to store instructions to control the activation of the light producing assembly 20. The controller 172 may further be in communication with an ambient light sensor 182. The ambient light sensor 182 may be operable to communicate a light condition, for example a level brightness or intensity of the ambient light proximate the vehicle 12. In response to the level of the ambient light, the controller 172 may be configured to adjust a light intensity output from the light producing assembly 20 and/or 60. The intensity of the light output from the light producing assembly 20 and/or 60 may be adjusted by controlling a duty cycle, current, or voltage supplied to the light producing assembly 20 and/or 60.

The controller may further be in communication with a proximity sensor 184. In various implementations, the proximity sensor 184 may correspond to various components that may be in communication with the controller 172. For example, the proximity sensor 182 may correspond to a Bluetooth sensor in communication with a mobile device, a cell phone signal detection device, a radar proximity system (e.g. blind spot warning and/or lane departure signal), and ultrasonic proximity detector (e.g. parking sensors on various portions of the exterior of the vehicle 12), cameras or imager (e.g. 360 degree surveillance or autonomous operation cameras, and driver assist cameras (e.g. backup cameras, blindspot cameras, forward directed cameras, etc.). Additionally, the proximity sensor 184 may correspond to a capacitive sensor, which may be disposed proximate a window, bumper, and various panels or trim of the vehicle, electro-magnetic sensors, laser sensors, and/or radar systems, which may be utilized in adaptive cruise control and/or driver assist systems. The proximity sensor may also correspond to at least one infrared sensor, which may be utilized in a lane departure or blindspot warning system.

In the various configurations discussed herein, the proximity sensor 184 may be in communication with the controller 172 and operable to detect an approaching occupant of the vehicle 12. In some implementations, the proximity sensor may be operable to identify a particular person or group of persons as detected by the proximity sensor 172. In such implementations, the proximity sensor 182 may be operable to identify an owner of the vehicle 12, family member of the vehicle 12 owner, owner of a vehicle that is the same brand or company of the vehicle 12, etc. In such implementations, the controller 172 may utilize the proximity sensor 184 to identify a signature or signal of a mobile device 186.

The mobile device 186 may correspond to a fob, key, cellular phone, etc. (e.g. a device having a radio frequency signature) detected proximate the vehicle 12. In this way, the controller 172 may detect a specific person or person belonging to a group based on the radio frequency signal and activate a lighting operation in response to the detection. By identifying different group of people affiliated with the vehicle 12 or a manufacturer of the vehicle 12, the controller may be operable to control the lighting a lighting operation of the illumination apparatus to emit light in a different timing, pattern, color, etc. based on a specific group or person approaching or departing from the vehicle 12.

The disclosure provides for novel systems and methods configured to illuminate at least a portion of a vehicle based on a detection of an approaching occupant or object approaching the vehicle. In the various embodiments, the disclosure provides for various systems and methods configured to detect and activate and control an illumination apparatus. In an exemplary embodiment, the disclosure provides for a system configured to identify an approaching or departing occupant of a vehicle and illuminate the car in first color or a second color. The first color may correspond to a warm white light configured to greet an approaching occupant and the second color may correspond to a cool white light configured to bid farewell a departing occupant.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
  a lighting device disposed on the vehicle;
  a proximity sensor configured to detect a proximity of a proximity device carried by an occupant; and
  a controller configured to identify an approach and a departure of the occupant based on the detected proximity and control the lighting device to output a first emission of light in response to the approach and a second emission in response to the departure.

2. The illumination apparatus according to claim 1, wherein the first emission corresponds to a first color of light and the second emission corresponds to a second color different from the first color.

3. The illumination apparatus according to claim 2, wherein the first emission comprises one or more wavelengths having a longer wavelength than the second emission.

4. The illumination apparatus according to claim 2, wherein the first color corresponds to a warmer color than the second color.

5. The illumination apparatus according to claim 4, wherein each of the first emission and the second emission correspond to substantially white light each having hues corresponding to the first color and the second color respectively.

6. The illumination apparatus according to claim 1, wherein the lighting device comprises a first light generating layer printed in a first liquid suspension configured to emit the first emission.

7. The illumination apparatus according to claim 6, wherein the lighting device comprises a second light generating layer printed in a second liquid suspension configured to emit the second emission.

8. The illumination apparatus according to claim 1, further comprising a light sensor in communication with the controller configured to communicate an ambient light signal to the controller to control the intensity of at least one of the first emission and the second emission.

9. The illumination apparatus according to claim 1, wherein the proximity sensor corresponds to a proximity antenna configured to detect a fob as a proximity device.

10. A vehicle lighting system comprising:
a lighting device disposed on the vehicle configured to output an emission of light;
an ambient light sensor configured to output an ambient light signal corresponding to an environment proximate the vehicle;
at least one detection sensor configured to output a detection signal to indicate a proximity of an occupant; and
a controller configured to:
identify an occupant proximate the vehicle and activate the emission based on the detection signal; and
control an intensity of the emission based on the ambient light signal.

11. The vehicle lighting system according to claim 10, wherein the controller is further configured to monitor the ambient light signal and record changes in a lighting level communicated by the ambient light signal.

12. The vehicle lighting system according to claim 10, wherein the controller is configured to set an intensity of the emission based on a recent maximum value or minimum value of the lighting level over a predetermined period of time.

13. The vehicle lighting system according to claim 12, wherein the predetermined period of time corresponds to the most recent 30 seconds to 10 minutes of data corresponding to the lighting level.

14. The vehicle lighting system according to claim 10, wherein the controller is configured to set the intensity of the emission to an increased level based on the recent maximum value that is brighter relative to the lighting level corresponding to a current light condition.

15. The vehicle lighting system according to claim 10, wherein the controller is configured to set the intensity of the emission to a decreased level based on the recent minimum value that is darker relative to the lighting level corresponding to a current light condition.

16. The vehicle lighting system according to claim 10, wherein the controller is further in communication with a rain sensor disposed on the vehicle configured to output a rain signal.

17. The vehicle lighting system according to claim 16, wherein the controller is configured to increase the intensity of the emission in response to having identified moisture from the rain sensor in a predetermined period of time.

18. A method for controlling at least one vehicle light source comprising the steps of:
detecting a light intensity of ambient light proximate a vehicle;
detecting a lighting event configured to activate the light source;
calculating an emission intensity of the light source based on the detected light intensity; and
activating the light source in response to a lighting event at the emission intensity, wherein the emission intensity is calculated based on the detected light intensity to activate the light source based on a lighting condition having occurred at a previous time.

19. The method according to claim 18, further comprising monitoring the light intensity while the light source is activated and adjusting the light intensity based on a current level of the light intensity.

20. The method according to claim 19, wherein the adjusting the light intensity based on a current level of the light intensity is smoothly adjusted relative to the current light level over a period of time corresponding to a difference between the current level and at least one of a maximum and a minimum of the light intensity identified in the data.

* * * * *